United States Patent [19]

Hagenlocher et al.

[11] Patent Number: 5,048,302
[45] Date of Patent: Sep. 17, 1991

[54] REFRIGERANT SYSTEM HAVING CONTROLLED VARIABLE SPEED DRIVE FOR COMPRESSOR

[75] Inventors: Thomas K. Hagenlocher, Huelben; Karl-Heinz Linnig, Friedrichshafen, both of Fed. Rep. of Germany; Michael P. Toomey, Charlotte, N.C.; Donald L. Hudson, Matthews, N.C.; David T. Bolen, Charlotte, N.C.

[73] Assignee: Hudson Associates, Inc., Charlotte, N.C.

[21] Appl. No.: 477,592

[22] Filed: Feb. 9, 1990

[51] Int. Cl.⁵ .................... F25B 1/00; F16H 59/00
[52] U.S. Cl. .................... 62/228.4; 474/18; 474/25
[58] Field of Search ............ 62/228.4, 228.3, 323.4; 417/212, 362; 474/25, 18

[56] References Cited

U.S. PATENT DOCUMENTS

| | | | |
|---|---|---|---|
| 1,807,774 | 6/1931 | De Remer | 62/228.4 |
| 2,045,870 | 6/1936 | Paton | 74/230.17 |
| 2,130,995 | 9/1938 | Henney | 62/6 |
| 2,295,161 | 9/1942 | Clay | 74/230.17 |
| 2,320,432 | 6/1943 | Henney | 62/6 |
| 2,346,868 | 4/1944 | Perry | 74/230.17 |
| 2,350,913 | 6/1944 | Mercer | 474/18 X |
| 2,459,377 | 1/1949 | Hallinan | 74/230.17 |
| 2,844,963 | 7/1958 | Stewart | 73/233 |
| 2,910,840 | 11/1959 | Miller | 62/209 |
| 2,917,937 | 12/1959 | Dodge | 74/336 |
| 3,425,288 | 2/1969 | Golden et al. | 74/230.17 |
| 3,872,842 | 3/1975 | Medley | 123/41.11 |
| 4,174,641 | 11/1979 | Hillman | 474/18 X |
| 4,228,691 | 10/1980 | Smirl | 474/12 |
| 4,381,174 | 4/1983 | Obler | 417/15 |
| 4,384,863 | 5/1983 | Huff et al. | 474/28 |
| 4,403,975 | 10/1983 | Rattunde | 474/18 |
| 4,411,590 | 10/1983 | Meredith | 415/26 |
| 4,441,376 | 4/1984 | Tobey | 74/89.15 |
| 4,614,089 | 9/1986 | Dorsey | 62/158 |
| 4,646,534 | 3/1987 | Russell | 62/228.4 |
| 4,720,981 | 1/1988 | Helt et al. | 62/113 |
| 4,748,822 | 6/1988 | Erbs et al. | 62/213 |
| 4,765,150 | 8/1988 | Persem | 62/215 |
| 4,800,730 | 1/1989 | Hipfl et al. | 62/323.4 X |

*Primary Examiner*—William E. Wayner
*Attorney, Agent, or Firm*—Bell, Seltzer, Park & Gibson

[57] ABSTRACT

A refrigeration system includes a compressor, a motor, variable pitch pulleys mounted on the ends of the compressor and motor shafts, and an endless belt looped around the motor and compressor pulleys for drivingly connecting the motor to the compressor. A sensor determines a variance in a refrigerant characteristic of the system from a predetermined value. An electrically powered actuator is responsive to the sensor and effects axial movement to one pulley component of the motor for thereby changing the pitch diameter of the motor pulley and to in turn vary the pitch diameter of the pulley on the compressor so as to change the speed of rotation of the compressor.

13 Claims, 2 Drawing Sheets

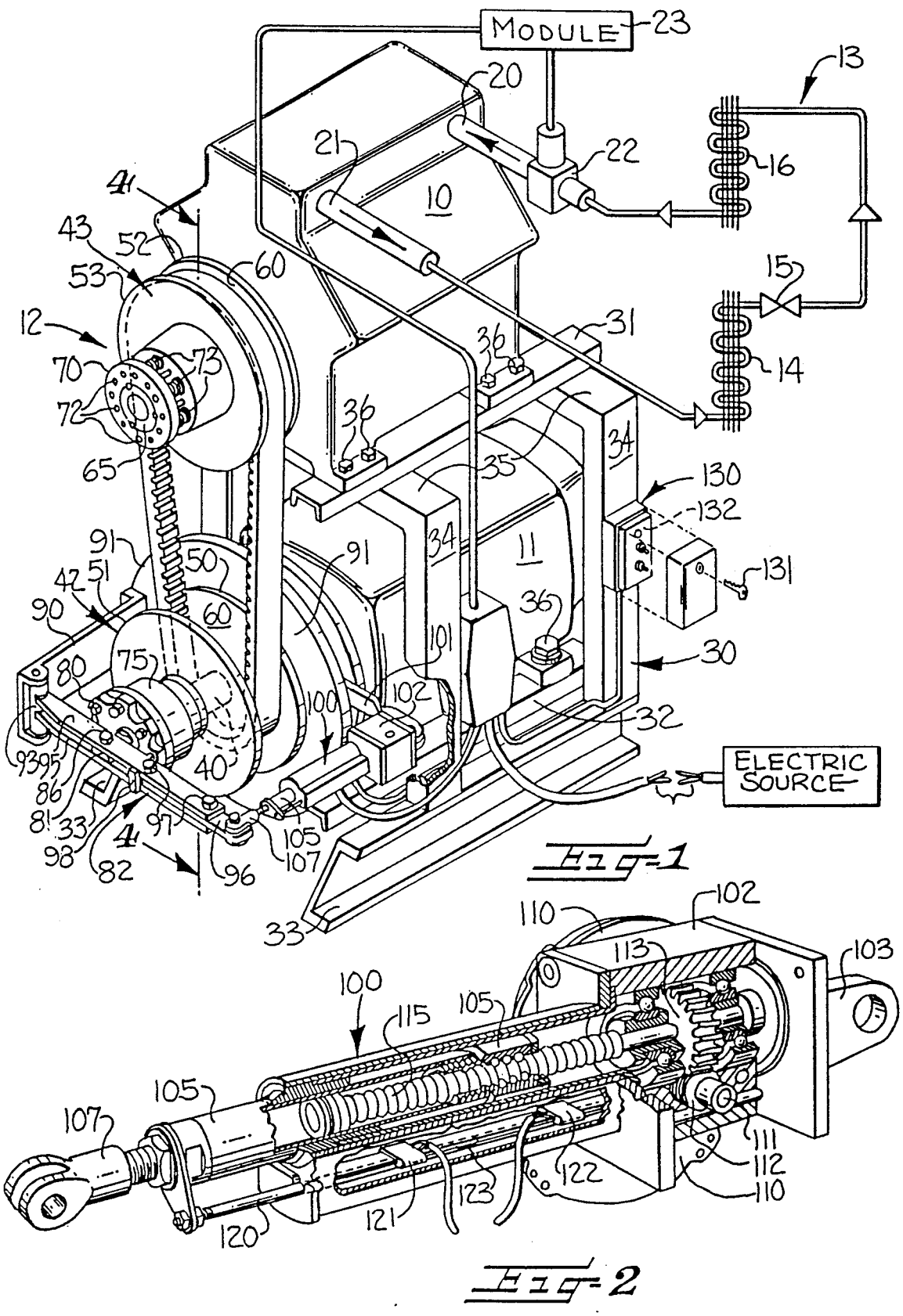

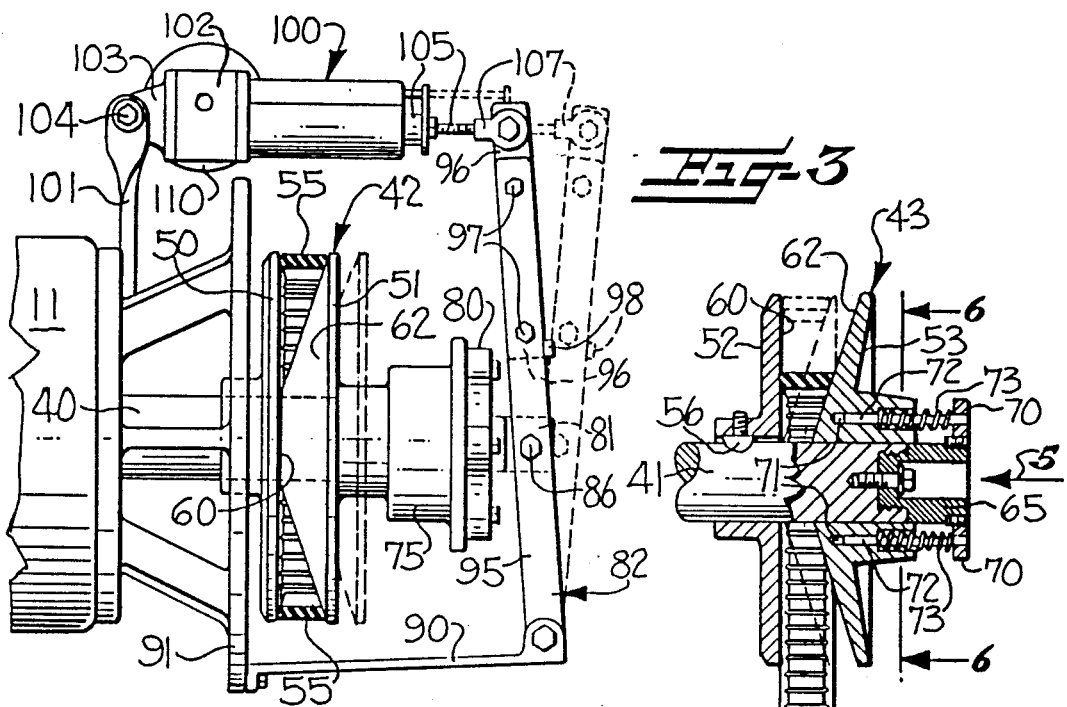
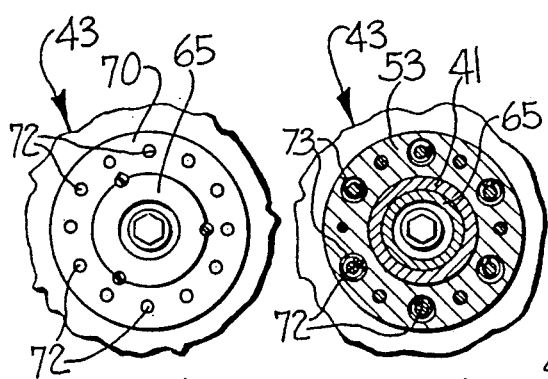
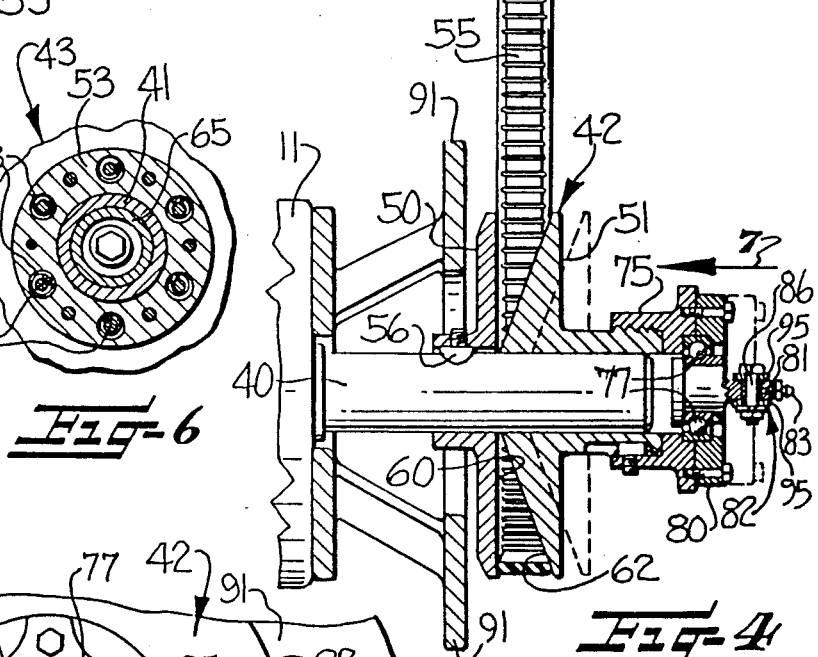
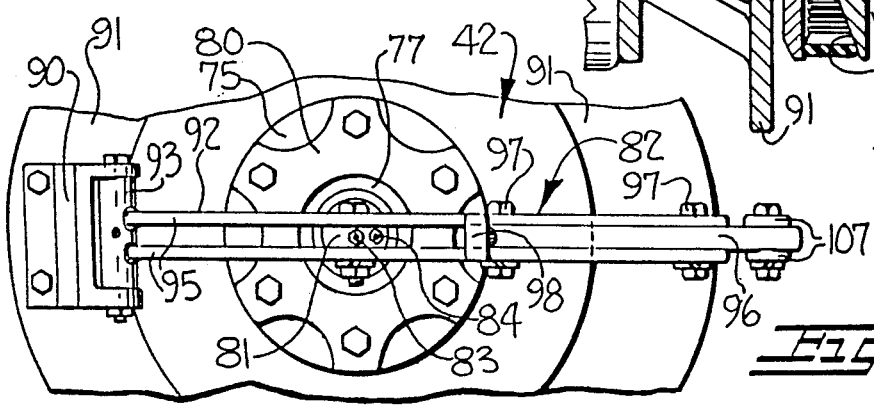

REFRIGERANT SYSTEM HAVING CONTROLLED VARIABLE SPEED DRIVE FOR COMPRESSOR

This invention relates to refrigerant systems having a controlled variable speed drive for the refrigerant compressor and more particularly to a variable speed drive operative with a constant speed motor and a refrigerant system compressor for changing the speed of the compressor for accommodating changing load requirements in the system.

BACKGROUND OF THE INVENTION

In some refrigerant systems, the refrigeration load requirements vary. For example, in some grocery store environments, one refrigerant system controls the air conditioning requirements, as well as the cooling load requirements for refrigerated food displays. These load requirements vary depending on the time of day, the ambient air temperature both inside and outside the store, the types of foods stacked in the refrigerated food displays, and the number of customers ingressing and egressing the store. The variations in load are most prevalent during the hottest, most humid days in the summer.

To compensate for these load variations, many refrigerant systems incorporate a compressor of variable capacity to accommodate the changing load demands. In some refrigerant systems, one large, single speed compressor, having enough capacity to account for peak load demands is cycled on and off during periods of low load requirements such as at night. However, this prior art technique is inefficient because it is difficult to maintain a constant, controlled temperature using only one cycled compressor and repeated on-off cycling of the compressor can damage the compressor. Other refrigeration systems include racks of smaller, constant speed compressors operating in parallel. Most of the compressors operate continually. During periods of peak load requirements, other reserve compressors are operated to account for the increased load demands. Even though the use of more than one compressor offers some advantage by having a more increased control over the refrigeration compressor capacity, the use of multiple compressors is expensive, and the installation and maintenance costs for the system are increased.

In another system, a variable speed electric motor drives the compressor. The motor includes an electronic inverter for varying the speed of the motor over a wide range. Refrigerant pressure or temperature is sensed and the motor speed adjusted to vary the speed and thus, capacity of the compressor. This system does offer some additional control over load variations as compared to other prior art systems. However, the complexity of the control electronics associated with the system and the use of an invertor for the electric motor can increase maintenance costs. Additionally, the complex electronics associated with this type of system typically only can be serviced by specially trained technicians. Many refrigeration technicians primarily are trained only in the mechanical workings associated with a refrigeration system. Thus, some refrigeration technicians may not be able to repair a breakdown in the electronics of the system.

As a result, it has been determined that a mechanical control for varying the speed of a refrigeration compressor for accommodating load variations is more desirable. It also has been determined that a preferred mechanical control includes variable pitch pulleys retained on a constant speed motor shaft and a compressor shaft and drivingly interconnected thereto by a belt. By effecting adjustment of the pulley pitch on both the motor and compressor, the relative speed of the compressor can be adjusted. Thus, complex electronics to control the speed of the motor are not needed. Additionally, the use of two variable pitch pulleys establishes a fixed center distance between the motor and compressor shafts and maintains a constant belt tension at maximum and minimum speed ranges so that the belt life is extended as compared to the belt life used in a system where the center distance between the motor and compressor shaft is varied.

Some older prior art refrigeration apparatus have incorporated belt interconnected variable pitch pulleys on a motor and compressor shaft, such as disclosed in U.S. Pat. Nos. 2,130,995 and 2,320,432 to Henney. In both patents, a pneumatic diaphragm is directly actuated by a temperature sensor. The pneumatic diaphragm pushes a mechanical lever mechanism directly connected to a movable pulley to change the pitch of same. This type of mechanical mechanism is inefficient for several reasons. As compared with more recent electrically powered motive means, only a small force can be generated to move the pulleys, making use of that mechanical type of device on larger motors impractical. Also, the diaphragm and lever mechanisms apparently do not provide means limiting axial movement of the pulley components so as to avoid driving the compressor at too low a speed and causing low oil flow with the resultant compressor burn-up. Additionally, the patents do not disclose that the motor and compressor can be fixedly mounted to a preferred rack having upper and lower levels to mount the motor and compressor to minimize floor space usage. The complex mechanical mechanisms incorporating the temperature controlled pneumatic diaphragm and lever mechanism could make installation of a motor and compressor on a preferred rack difficult.

Other prior art patents disclose similar pneumatically controlled mechanisms as well as fluid coupling such as commonly used in automobiles. These also suffer similar and other drawbacks.

It is therefor an object of this invention to provide a refrigerant system having a controlled variable speed drive for a compressor and which includes variable pitch pulleys mounted on a constant speed motor and compressor shafts, a belt interconnecting the pulleys and electrically powered motive means for varying the axial position of one motor pulley component for changing the speed of the compressor.

It is another object of this invention to provide a refrigerant system having a controlled variable speed drive for a compressor and which includes variable pitch pulleys mounted on constant speed motor and compressor shafts, a belt interconnecting the pulleys, electrically powered motive means for varying the axial position of one pulley component, and means operatively connected to said electrically powered motive means for deactivating the same for limiting axial movement of the movable motor pulley component away from the other motor pulley component to thereby avoid driving the compressor at too low a speed.

It is still another object of this invention to provide a refrigerant system having an upright rack for mounting on upper and lower levels thereof, a constant speed motor and refrigerant compressor and a controlled variable speed drive for the compressor which includes variable pitch pulleys mounted on a constant speed motor and compressor shafts, a belt interconnecting the pulleys, and electrically powered motive means for varying the axial position of one motor pulley component and change the speed of the compressor.

It is still another object of this invention to provide a controlled variable speed drive apparatus for an electric motor having variable pitch pulleys thereon and coupled by a belt to variable pitch pulleys mounted on a power input shaft of a refrigerant system compressor and the like and which includes pivotally mounted lever means extending transversely of the axis of the motor pulley and electrically powered motive means operatively connected to one end of the lever for imparting pivotal movement to the lever and changing the pitch diameter of the motor pulley to change the speed of rotation of the power input shaft.

SUMMARY OF THE INVENTION

These and other objects and advantages of the present invention are accomplished by a refrigerant system having a compressor with an external shaft, and a constant speed motor having an external shaft extending substantially parallel to the compressor shaft at a fixed center distance therefrom. Respective variable pitch pulleys having inner and outer pulley components are mounted on the ends of the motor and compressor shafts. One pulley component of each pulley is axially movable relative to the other pulley component. An endless belt is looped around the motor and compressor pulleys for drivingly connecting the motor to the compressor. Sensing means is included for sensing a variance in refrigerant pressure from a predetermined value at a predetermined location in the refrigerant system.

Means including electrically powered motive means, is responsive to a sensed variation in pressure and varies the axial position of one pulley component of the motor pulley and also varies the axial position of one pulley component of the compressor so as to vary the pitch of the compressor pulley. Means operatively connected to the electrically powered motive means deactivates same for limiting axial movement of the movable motor pulley component away from the other motor pulley component to thereby avoid driving the compressor at too low a speed.

Preferably, the responsive means includes a pivotally mounted lever extending transversely of the axis of the motor pulley and connected to the on axially movable motor pulley component. The electrically powered motive means is in the form of a linear actuator, and is operatively connected to one end of the lever. The electrically powered motive mean is responsive to the sensing means for imparting pivotal movement to the lever for effecting axial movement to one pulley component of the motor for thereby changing the pitch diameter of the motor pulley and to in turn vary the pitch diameter of the pulley on the compressor so as to change the speed of rotation of the compressor.

BRIEF DESCRIPTION OF THE DRAWINGS

Some of the objects and advantages of the present invention having been stated, others will be more fully understood from the detailed description which follows and by reference to the accompanying drawings in which:

FIG. 1 is an isometric view of the compressor, electric motor and the pivotally mounted lever connected to one axially movable motor pulley and the linear actuator for changing the pitch diameter of the motor pulley in accordance with the present invention, and additionally showing in a highly diagrammatic schematic a refrigeration circuit having the compressor coupled thereto.

FIG. 2 is a partial, fragmentary, isometric view of the linear actuator showing in detail the components present therein.

FIG. 3 is a sectional plan view of the electric motor showing the variable pitch pulleys, the pivotally mounted lever arm and the linear actuator connected thereto.

FIG. 4 is a sectional view taken along line 4—4 of FIG. 1 and showing in detail the structure of the variable pitch pulleys which are mounted on respective motor and pulley shafts.

FIG. 5 is a plan view of the compressor hub looking in the direction of arrow 5 of FIG. 4.

FIG. 6 is a sectional view of the compressor hub taken along line 6—6 of FIG. 4.

FIG. 7 is a plan view of the motor hub looking in the direction of the arrow 7 of FIG. 4.

DETAILED DESCRIPTION OF THE PREFERRED EMBODIMENTS

Referring now to the drawings and more particularly to FIG. 1, there is shown a refrigerant compressor 10 and constant speed electric motor 11 having connected thereto a variable speed drive 12 in accordance with the present invention. The compressor 10 is coupled within a refrigerant system partly shown schematically at 13. The refrigerant system 13 is typical of a refrigerant system used in a grocery store or and other similar environment which includes a condenser 14, an expansion valve 15, and an evaporator 16 for absorbing heat from a closed area such as a grocery store or a smaller refrigerated food display case. As illustrated, the compressor 10 includes respective intake and discharge ports 20, 21 for coupling the compressor 10 into the refrigerant system 13. The refrigerant system 13 includes a sensor 22 for sensing a important characteristic of the refrigerant system 13 such as the pressure or temperature. Preferably, the sensor is positioned at the intake port 20 for measuring the pressure of the system. Preferably, the sensor is in the form of a transducer and generates pulses for transmission to an electronic module 23 for controlling the speed of the compressor.

The motor 11 and compressor 10 are fixed on an upright rack 30 having upper and lower levels 31, 32. The rack 30 also includes floor engaging legs 33 to define the lower level 32 to support the motor 11 thereon. Vertically extending members 34 support horizontally extending bar support members 35 to define the upper level which supports the compressor 10 thereon. Both the motor 11 and compressor 10 are fixed to the rack 30 by suitable mean such as bolts 36 so as to facilitate ready removal and maintenance. The compressor 10 is positioned on the upper level 31 of the rack to facilitate maintenance of the compressor and the connection of various refrigeration lines to the intake and discharge ports 20, 21.

In the illustrated embodiment, a large compressor and large motor are shown. The motor 11 is a 40 horsepower constant speed motor. The compressor has a 30 ton capacity. Typically, a grocery store includes smaller motors, i.e. 7.5 to as high as 20 horsepower motors coupled to smaller, semihermetic compressors, and requires approximately 120 total horsepower with a larger number of smaller compressors. For example, ten smaller compressors could be used in a store to operate the air conditioning system and the refrigerated food display cases. However, the large motor 11 and compressor 10 illustrated in FIG. 1, can be utilized effectively to refrigerate a plurality of refrigerated food displays or meet the air conditioning requirements for the store. Otherwise, a bank of smaller compressors and motors in accordance with the present invention can be fixed on one or more racks and operated in parallel. The actual number of compressors and their load size will vary by the engineering design and choice of the designer.

As shown in greater detail in FIG. 4, the electric motor includes a shaft 40 extending outwardly therefrom which is positioned substantially parallel to the compressor shaft 41 at a fixed center distance therefrom. The center distance between both shafts 40, 41 can vary. However, it is preferred that the separation distance be minimized for space requirements. Each motor and compressor shaft 40, 41 includes respective variable pitch pulleys 42, 43 having respective motor and compressor inner and outer pulley components 50, 51, 52, 53 mounted on the ends of the motor and compressor shafts 40, 41 and interconnected by a belt 55. Each variable pitch pulley 42, 43 is positioned outwardly of one side of the rack 30 so as to make the pulleys 42, 43 readily accessible for maintenance and belt changing. The inner pulley components 50, 52 on both motor and compressor shafts 40, 41 are fixed to the shafts by appropriate key members 56. Both motor and compressor inner pulley components 50, 52 have respective flat surface sides 60, which as will be explained later in detail, prevent excessive downward thrust of the belt against the shafts 40, 41. The flat side directs the generated forces inward toward the motor 10 and compressor 11. The outer pulley component 51, 53 on each shaft 40, 41 are axially movable and each respective motor and compressor pulley component includes an inwardly tapered side 62 on which the belt 55 rides.

As illustrated, the endless belt 55 is looped around the pulleys 42, 43. The belt 55 is a conventional lug belt having tapered side portions such as typically used by those skilled in the art. As the outer pulley component 51 on the motor shaft 40 is moved axially on the shaft, the belt 55 rides inward to the pulley or outward therefrom. As will be explained in detail later, the corresponding outer pulley 53 on the compressor shaft 41 also moves inversely outward or inward. Because a fixed center distance remains between the compressor and motor shafts 40, 41, as the belt 55 rides lower in the motor pulley 42, such as when the outer motor pulley 51 is moved outwardly therefrom, the outer pulley 53 on the compressor shaft 41 moves inward to allow the belt 55 to ride higher thereon and reduce the speed of the compressor 10.

Referring now to FIG. 4 there is shown the construction of the variable pitch pulley 43 received onto the compressor shaft 41. The outer pulley component 53 is slidably received onto the compressor shaft 41. A hub 65 is threadably received onto the shaft 41 and is retained thereon by a bolt 66. The hub 65 includes an outer circular flange member 70 having a plurality of holes spaced therearound which are aligned with bores in the axially movable outer pulley component 53. Pins 72 extend through the flange holes into the bores. The pins 72 are fixed to the outer flange member 70. Each bore 71 within the outer pulley component 53 is counterbored to receive spring 73 therein which extends outwardly toward the circular flange member 70 inner side to bias inwardly the outer pulley 53 toward the inner pulley 52 (FIG. 6). As will be explained later in detail, when the outer motor pulley 51 is forced inward so that the belt 55 rides higher on the motor pulley, the generated forces exerted by the belt overcome the spring tension to force the compressor outer pulley component 53 outward to accommodate the change brought about by the inward movement of the outer motor pulley 42.

Referring now to the variable pitch pulley 42 mounted on the motor shaft 40, the outer motor pulley also includes a motor hub 75 threaded onto a horizontally extending hub receiving extension of the motor outer pulley component 51. The hub 75 includes a coaxial opening to receive a bearing 77 and stub shaft 78. The stub shaft 78 is free to rotate relative to the motor hub 75. The bearing 77 is retained within the hub by a bearing support plate 80 secured by bolts 80a to the hub. The terminus end of the stub shaft extends through the support plate 80 and includes, a flat tab 81 extending outwardly therefrom to receive and be straddled by a clevis-like lever arm 82 in accordance with the present invention (FIGS. 3 and 7). The tab 81 includes first and second grease channels having grease fittings 83, 84 connecting thereto. The first grease fitting and channel 83 provides lubrication to the bearing 77. As will be explained later in detail, the second grease fitting and channel 84 provides lubrication to a bolt and lubrication collet 86 which aids in retaining the lever arm 82 to the tab 81 (FIGS. 4 and 7).

Referring now more particularly to FIGS. 1, 3 and 7, there is shown the pivotably mounted lever arm 82 in accordance with the present invention. The lever arm 82 is pivotably mounted to a mounting bracket 90 bolted to the housing flange 91 of the motor 11 (FIG. 3). The bracket 90 is formed preferably from a rigid, plate steel and extends outwardly from the housing a distance slightly greater than the distance the motor hub 75 and receiving tab 81 extend outwardly from the motor shaft 40. As illustrated, the lever arm 82 includes a first member 92 formed of two horizontally extending bars welded to a collar 93 received between the supports of the bracket 90 (FIG. 7). A pin extends into the collar 93 to pivotally retain the first lever member 92 to the bracket 90. The first lever member is formed from two, substantially parallel flat bars 95, which are spaced parallel from each other a distance substantially equal to the width of the receiving tab 81 to form a clevis-like arm (FIG. 7). The motor receiving tab 81 is received between the two horizontally extending bars 95. The tab 81 includes a hole dimensioned to receive the bolt and lubrication collet 86 which extend through both members of the clevised bar and into the collet. The grease fitting and channel 84 provide lubrication to the bolt and collet 86 as required. As illustrated, the first lever member 92 extends substantially across the width of the motor pulley 42.

A second lever 96 member is received between the clevis-like flat bars 95 of the first lever member 92. This second lever member 96 extends from a point adjacent the motor hub 75 linearly with the first lever member 92. The second lever member 96 is secured to the first lever member 92 by appropriate means, such as bolts 97. The second lever member 96 also includes a terminus end pivotally mounted to an actuating arm of electrically powered motive means 100 such as will be described later. A nub 98 is positioned on the outer side of the second lever member 96 for engaging the clevis-like bars 95 so that when the retaining bolts 97 are removed, the second bar member cannot be pivoted completely through the clevis-like bars 95 of the first lever member. As will be explained later in detail, the multi-piece construction of the lever arm 82 facilitates belt changing and maintenance of the motor and compressor.

As illustrated in FIG. 3, the electrically powered motive means 100 is in the form of a linear actuator. Although other motive means having different torque generating mechanisms and gear reduction means can be used, it has been found that a linear actuator provides sufficient force necessary to move the lever arm 82 and pulley connected thereto. As illustrated, the linear actuator 100 is pivotally mounted to the motor housing flange 91 by a bracket assembly 101. The linear actuator 100 includes a main body portion 102 having a mounting flange 103 secured by a pin 104 to the bracket assembly 101 so that the linear actuator 100 can pivot upon the bracket assembly. The linear actuator 100 also includes an actuator arm 105 which can be extended or retracted from the body 102. The linear actuator arm 105 has an outer end which includes a forked extension 107 which is dimensioned for receiving therein the second lever member 96. A bolt extends through the forked extension 107 and the second lever member 96 to pivotally retain the lever member to the actuator arm 105. In accordance with the present invention, as the linear actuator arm 105 is extended, the multi-pieced lever arm 82 is pivoted to move the outer motor pulley component 51 outwardly on the motor shaft 40 so that the belt 55 rides deeper in the motor pulley 42. At the same time, the compressor outer pulley component 53 is forced inwardly by the springs 73 so that the belt 55 rides higher on the compressor pulley 43 so that the compressor speed is slowed.

The linear actuator 100 provides for a wide range of compressor speeds. The compressor 10 can operate at speeds ranging from 700–1750 rpm. The linear actuator 100 provides the high force needed to move the outer motor pulley component 51 axially in and out on the shaft. As shown in greater detail in FIG. 1, the linear actuator 100 is controlled by an electronic module 23 such as conventionally used in the industry. The module 23 is connected to receive the generated pressure pulses of the pressure transducer 22. The pulses travel to the module 23 which in turn, generates a DC voltage output for driving the DC motor 110 on the linear actuator. The full travel of the actuator arm is approximately 80 millimeters and moves in 11 millimeter increments. Thus, the linear actuator 100 provides for seven incremental movement steps with each 11 mm movement step moving the lever arm corresponding to an approximate 150 rpm increment change in compressor speed. This large incremental increase in rpm is desirable as compared to smaller incremental changes so as to prevent a continual speed change over brief periods of time.

Referring now to FIG. 2, details of the construction of the linear actuator 100 are shown. The linear actuator 100 includes a 24 volt DC drive motor 110 for receiving generated pulses from the module 23. The DC motor 110 is fixed to the body 102 of the actuator and includes gear reduction means connected thereto. Gear reduction means preferably is in the form of an output shaft 111 having a worm gear 112 thereon. The worm gear 112 interconnects a bevel gear 113 received onto a threaded longitudinally extending shaft 115 which extends the coaxial length of the actuator body 102. The threaded shaft 115 is received into the actuator arm 105 and the arm retained thereon by internal thread fittings which engage the threaded shaft 115. In operation, generated module pulses cause the DC motor shaft 111 to rotate. The worm gear 112 rotates the bevel gear 113 at a reduced gear ratio to provide a high torque to the longitudinally extending threaded actuator shaft 115. As the threaded actuator shaft rotates, the actuator arm is extended outward or retracted inward.

The guide bar 120 is received within the actuator body 102 and is moved therewithin as the actuator arm 105 moves. Within the body 102, first and second magnetic limit switches 121, 122 which connect to the DC motor 110 are positioned adjacent the path of travel of the guide bar 120. A small, medial section 123 of the guide bar 120 is magnetized, and when that magnetized section engages a limit switch, the DC motor is deactivated to prevent further movement of the actuator ar 105. The limit switches provide for maximum and minimum travel of the actuator arm. The first limit switch 121 provides for a maximum outward movement of the actuator arm 105 from the housing. This limit switch 121 is necessary to prevent the compressor speed dropping below a predetermined value. Slow compressor speeds prevent adequate oil flow and create high heat within the compressor which can damage the compressor. In the illustrated embodiment having a 40 ton capacity open drive compressor, the limit switch is positioned to prevent the actuator arm 105 extending too far and allowing the compressor speed to drop below 700 rpm. The second limit switch 12 limits maximum retraction of the actuator arm 105 so as to prevent the belt 55 from being forced to ride along the very outer edge of the motor pulleys and creating an undesirably high compressor speed. The 11 mm incremental steps also provide a dampening effect to the apparatus so that the actuator arm will not over react to small changes in sensed pressure. The linear actuator arm moves the corresponding 11 millimeter increments only when a predetermined change in sensed pressure occurs. It is anticipated that pressure will be sensed every four to five seconds.

The system also includes a manual bypass 130 (FIG. 1). The bypass 130 is activated by a key 131 which removes control of the actuator 100 from the module 23. The bypass includes a potentiometer 132 connected with the linear actuator so that the actuator arm 105 can be moved in and out by adjusting the potentiometer. The bypass 130 is necessary to facilitate maintenance of the system and trouble shooting of same because an operator can manually adjust operating speeds of the compressor.

Additionally, maintenance is facilitated by the construction of the multi-piece lever arm 82 which aids in belt removal. The bolts 97 securing the first and second lever arm members 92, 96 to each other are removed and the second lever arm member pivoted outward from the first lever arm member. The bolt 86 extending through the first lever arm and tab 81 is removed, and the bolts 80a retaining the bearing support plate to the outer motor pulley hub are removed. The outer pulley component 51 and belt 55 then can be removed. By separating first and second lever members, the linear actuator arm does not have to be extended so as to pivot the arm an extended distance outwardly to facilitate removal therefrom.

While the variable speed drive of the present invention has been described in reference to a refrigerant system, it is contemplated that this variable speed drive arrangement can reasonably be used in other environments. For example, the power input shaft of a water pump or conveyor can be coupled to a constant speed motor having the variable speed drive and the speed of the power input shaft varied at different times when necessary. Volume of water can be measured for controlling the speed of the pump shaft, or with a conveyor, distance or time can be measured for regulating the variable speed drive and speed of the conveyor. Physical parameters such as time, distance, volume, pressure, and temperature can be measured for changing the speed of a power input shaft coupled to the variable speed drive as the need arises for speed regulation.

The foregoing embodiment is to be considered illustrative rather than restrictive of the invention and those modifications which come within the range of equivalents of the claims to be included therein.

That which is claimed is:

1. A refrigerant system comprising a compressor with an external shaft, a constant speed motor having an external shaft extending substantially parallel to said compressor shaft at a fixed center distance therefrom, respective variable pitch pulleys having inner and outer pulley components mounted on the ends of the shafts of said motor and compressor, one pulley component of each pulley being axially movable relative to the other pulley component, an endless belt looped around said motor and compressor pulleys for drivingly connecting said motor to said compressor, said looped belt always being under constant tension due to the center distances between said motor and compressor shafts being constant, sensing means for sensing a variance in refrigerant characteristic from a predetermined value at a predetermined location in the refrigerant system, means operatively connected to said one movable pulley component of said motor pulley and being responsive to a sensed variation in the refrigerant characteristic for varying the axial position of said one pulley component of said motor pulley and to in turn vary the axial position of said one pulley component of said compressor so as to vary the pitch of said compressor pulley, said responsive means including a linear actuator having a plurality of incremental movement steps of predetermined values for incrementally moving said movable motor pulley component and incrementally changing the speed of the compressor.

2. A refrigerant system according to claim 1 including means operatively connected to said linear actuator for deactivating the same for limiting axial movement of the movable motor pulley component away from the other motor pulley component to thereby avoid driving the compressor at too low a speed.

3. A refrigerant system according to claim 1 wherein said linear actuator comprises an electrical motor, gear reduction means driven by said motor, and elongate longitudinally movable means having an inner end connected to said gear reduction means.

4. A refrigerant system comprising a compressor with an external shaft, a constant speed motor having an external shaft extending substantially parallel to said compressor shaft at a fixed center distance therefrom, respective variable pitch pulleys having inner and outer pulley components mounted on the ends of the shafts of said motor and compressor, one pulley component of each pulley being axially movable relative to the other pulley component, an endless belt looped around said motor and compressor pulleys for drivingly connecting said motor to said compressor, said looped belt always being under constant tension due to the center distances between said motor and compressor shafts being constant, sensing means for sensing a variance in a refrigerant characteristic from a predetermined value at a predetermined location in the refrigerant system, and means responsive to a sensed variation in the refrigerant characteristic for varying the axial position of said one pulley component of said motor pulley and to in turn vary the axial position of said one pulley component of said compressor so as to vary the pitch of said compressor pulley, said responsive means comprising pivotally mounted lever means extending transversely of the axis of said motor pulley and connected to said one axially movable motor pulley component and a linear actuator operatively connected to one end of said lever means, said linear actuator having a plurality of incremental steps of predetermined values and being responsive to said sensing means for imparting pivotal incremental movement to said lever means for effecting axial incremental movement to said one pulley component of said motor for thereby incrementally changing the pitch diameter of the motor pulley and to in turn incrementally vary the pitch diameter of said pulley on said compressor pulley so as to incrementally change the speed of rotation of the compressor.

5. A refrigerant system according to claim 4 including means operatively connected to said linear actuator for deactivating the same for limiting axial movement of the movable motor pulley component away from the other motor pulley component to thereby avoid driving the compressor at too low a speed.

6. A refrigerant system according to claim 4 wherein said linear actuator comprises an electrical motor, gear reduction means driven by said motor, and an elongate longitudinally movable means having an inner end connected to said gear reduction means.

7. A refrigerant system according to claim 4 wherein said pivotally mounted lever means is a multi-piece construction and includes a first pivotally mounted lever member connected to said axially movable pulley means, and a second lever means operably connected to said electrically powered motive means and releasably coupled to said first lever member so that said first and second lever members can be disengaged from each other to facilitate belt removal and maintenance.

8. A refrigerant system comprising an upright rack having upper and lower levels, a compressor with an external shaft mounted on one level of said rack, a constant speed electric motor mounted on the other level of said rack, said electric motor having an external shaft extending substantially parallel to said compressor shaft at a fixed center distance therefrom, respective variable pitch pulleys having inner and outer pulley components mounted on the ends having inner and outer pulley components mounted on the ends of the shafts of said motor and compressor, said pulleys being positioned outwardly of one side of said rack so as to be readily accessible, one pulley component of each pulley being axially movable relative to the other pulley component, an endless belt looped around said motor and compressor pulley for drivingly connecting said motor to said compressor, said looped belt always being under constant tension due to the center distances between said motor and compressor shafts being constant, sensing means for sensing a variance in a refrigerant characteristic from a predetermined value at a predetermined location in the refrigerant system, and means operatively connected to said one movable pulley component of said motor pulley and being responsive to a sensed variation in the refrigerant characteristic for varying the axial position of said one pulley component of said motor pulley and to in turn vary the axial position of said one pulley component of said compressor so as to vary the pitch of said compressor pulley, said responsive means including a linear actuator having a plurality of incremental movement steps of predetermined values for incrementally moving said movable motor pulley component and incrementally changing the speed of the compressor.

9. A refrigerant system according to claim 8 wherein said responsive means includes pivotally mounted lever means extending transversely of the axis of the motor pulley and connected to said one axially movable pulley component thereof, said lever means having an end connected to said linear actuator.

10. A refrigerant system according to claim 8 including means operatively connected to said linear actuator for deactivating the same for limiting axial movement of the movable motor pulley component away from the other motor pulley component to thereby avoid driving the compressor at too low a speed.

11. A variable speed drive apparatus comprising a constant speed electric motor having an external shaft, a power input shaft extending substantially parallel to said motor shaft at a fixed center distance therefrom, respective variable pitch pulleys having inner and outer pulley components mounted on the end of said motor shaft and the end of said power input shaft, one pulley component of each pulley being axially movable relative to the other pulley component, an endless belt looped power input shaft, said looped belt always being under constant tension due to the center distances between said motor and compressor shafts being constant, and means for varying the axial position of said one pulley component of said motor pulley and to in turn vary the axial position of said one pulley component of said power input shaft comprising pivotally mounted lever means extending transversely of the axis of said motor pulley and connected to said one axially movable motor pulley component and a linear actuator operatively connected to one end of said lever means for imparting pivotal movement to said lever means, said linear actuator having a plurality of incremental steps of predetermined values for effecting incremental axial movement to said one pulley component of said motor for thereby incrementally changing the pitch diameter of the motor pulley and to in turn incrementally vary the pitch diameter of said pulley on said power input shaft so as to incrementally change the speed of rotation of the power input shaft.

12. A variable speed drive apparatus according to claim 11 wherein said linear actuator comprises an electrical motor, gear reduction means driven by said motor, and elongate longitudinally movable means having an inner end connected to said gear reduction means and an outer end connected to one end of said lever means.

13. A variable speed drive apparatus according to claim 11 wherein said pivotally mounted lever means is of multi-piece construction and includes a first lever member connected to said axially movable pulley means, and a second lever member operably connected to said linear actuator and releasably coupled to said first lever member so that said first and second lever members can be disengaged from each other to facilitate belt removal and maintenance.

* * * * *

UNITED STATES PATENT AND TRADEMARK OFFICE
CERTIFICATE OF CORRECTION

PATENT NO. : 5,048,302

DATED : September 17, 1991

INVENTOR(S) : Thomas K. Hagenlocher, et al.

It is certified that error appears in the above-identified patent and that said Letters Patent is hereby corrected as shown below:

Column 3, line 49, delete "on" and insert --one--

Column 3, line 53, delete "mean" and insert --means--

Column 4, line 42, delete the second occurrence of "a" and insert --an--

Column 8, line 21, delete "ar" and insert --arm--

Column 8, line 34, delete "12" and insert --122--

Column 8, line 36, after "ride along" there should be no break in the paragraph.

UNITED STATES PATENT AND TRADEMARK OFFICE
CERTIFICATE OF CORRECTION

PATENT NO. : 5,048,302

DATED : September 17, 1991

INVENTOR(S) : Thomas K. Hagenlocher, et al

It is certified that error appears in the above-identified patent and that said Letters Patent is hereby corrected as shown below:

Column 12, line 1, after "looped" insert --around said pulleys for drivingly connecting said motor to said--

Signed and Sealed this

Thirtieth Day of March, 1993

Attest:

STEPHEN G. KUNIN

*Attesting Officer*     *Acting Commissioner of Patents and Trademarks*